US008925381B2

(12) United States Patent
Trogdon

(10) Patent No.: US 8,925,381 B2
(45) Date of Patent: *Jan. 6, 2015

(54) NAUTICAL INSTRUMENT

(71) Applicant: Peter Trogdon, Arnold, MD (US)

(72) Inventor: Peter Trogdon, Arnold, MD (US)

(*) Notice: Subject to any disclaimer, the term of this patent is extended or adjusted under 35 U.S.C. 154(b) by 0 days.

This patent is subject to a terminal disclaimer.

(21) Appl. No.: 13/778,017

(22) Filed: Feb. 26, 2013

(65) Prior Publication Data

US 2013/0167767 A1 Jul. 4, 2013

Related U.S. Application Data

(63) Continuation of application No. 11/874,894, filed on Oct. 18, 2007, now Pat. No. 8,381,585, which is a continuation of application No. 11/429,388, filed on May 5, 2006, now Pat. No. 7,293,456.

(51) Int. Cl.
G01C 21/00 (2006.01)
B63B 49/00 (2006.01)
G01D 11/30 (2006.01)

(52) U.S. Cl.
CPC ............... B63B 49/00 (2013.01); G01D 11/30 (2013.01)
USPC ...................................... 73/178 R

(58) Field of Classification Search
None
See application file for complete search history.

(56) References Cited

U.S. PATENT DOCUMENTS

| | | | |
|---|---|---|---|
| 1,806,295 A | 5/1931 | Kinnard | |
| 2,463,844 A | 3/1949 | Anderson | |
| 3,599,910 A | 8/1971 | Wipff | |
| 3,912,216 A | 10/1975 | Gano | |
| 3,955,790 A | 5/1976 | Ballin | |
| 4,315,615 A | 2/1982 | Scocozza | |
| 4,318,528 A | 3/1982 | Dobson | |
| 4,534,307 A | 8/1985 | Overs | |
| 4,850,559 A | 7/1989 | Boucher | |
| 4,920,799 A | 5/1990 | Low | |
| 5,433,416 A | 7/1995 | Johnson | |
| 5,799,804 A | 9/1998 | Sharpe | |
| 5,803,425 A | 9/1998 | McCoy, II | |
| 6,126,128 A | 10/2000 | Costa et al. | |
| 6,141,881 A | 11/2000 | Ayers et al. | |
| 6,179,253 B1 | 1/2001 | Cotton | |
| 6,244,558 B1 | 6/2001 | Castle | |
| 6,370,037 B1 | 4/2002 | Schoenfish | |
| 6,422,520 B1 | 7/2002 | Hand | |
| 6,508,192 B2 | 1/2003 | Lentine | |
| 6,508,449 B2 | 1/2003 | Veazey | |
| 6,529,381 B1 | 3/2003 | Schoenfish | |
| 6,540,193 B1 | 4/2003 | DeLine | |
| 6,629,680 B2 | 10/2003 | Weck et al. | |
| 6,758,455 B2 | 7/2004 | Weck et al. | |
| 6,783,106 B2 | 8/2004 | Barnes | |
| 6,854,328 B2 * | 2/2005 | Badiali | ........................... 73/431 |
| 8,381,585 B2 * | 2/2013 | Trogdon | ..................... 73/178 R |

* cited by examiner

*Primary Examiner* — Lisa Caputo
*Assistant Examiner* — Jermaine Jenkins
(74) *Attorney, Agent, or Firm* — Belles Katz LLC

(57) ABSTRACT

A nautical instrument that can be repetitively mounted to and removed from a surface within a ship without the use of tools or other instruments. The nautical instrument incorporates a mounting system that achieves slidable locking engagement of the nautical instrument to a bulkhead plate that is permanently secured to the surface of the ship. In one embodiment, the invention is a nautical instrument comprising a housing having a bracket assembly comprising a downwardly extending overhang section that forms first and second channels between the overhang section and a rear surface of the back plate, the channels opposing one another in an angled orientation; and a mounting plate assembly connected to a front surface of a bulkhead plate, the mounting plate assembly having first and second angled edges adapted to be slidably inserted into the first and second channels of the bracket assembly.

20 Claims, 10 Drawing Sheets

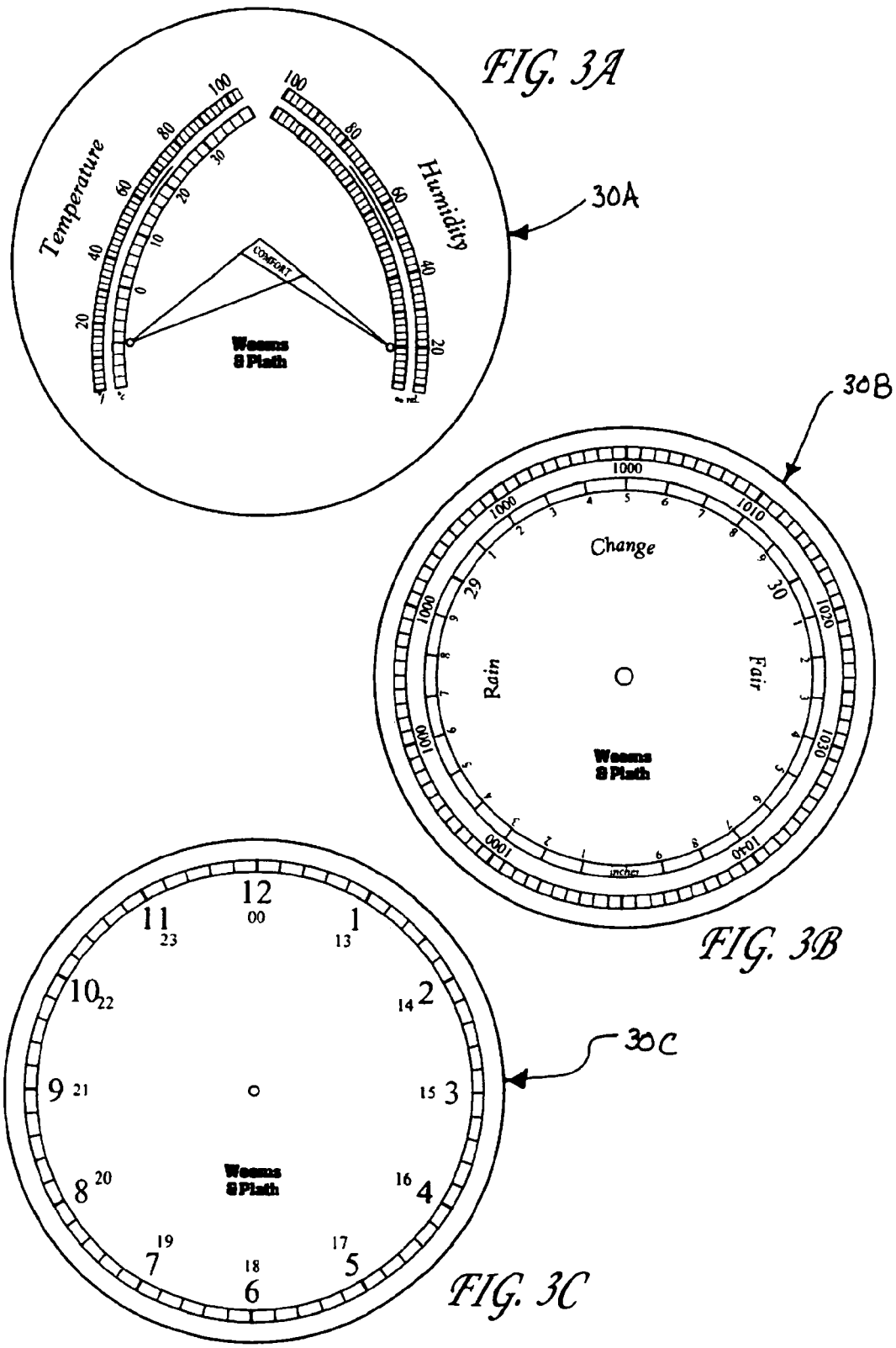

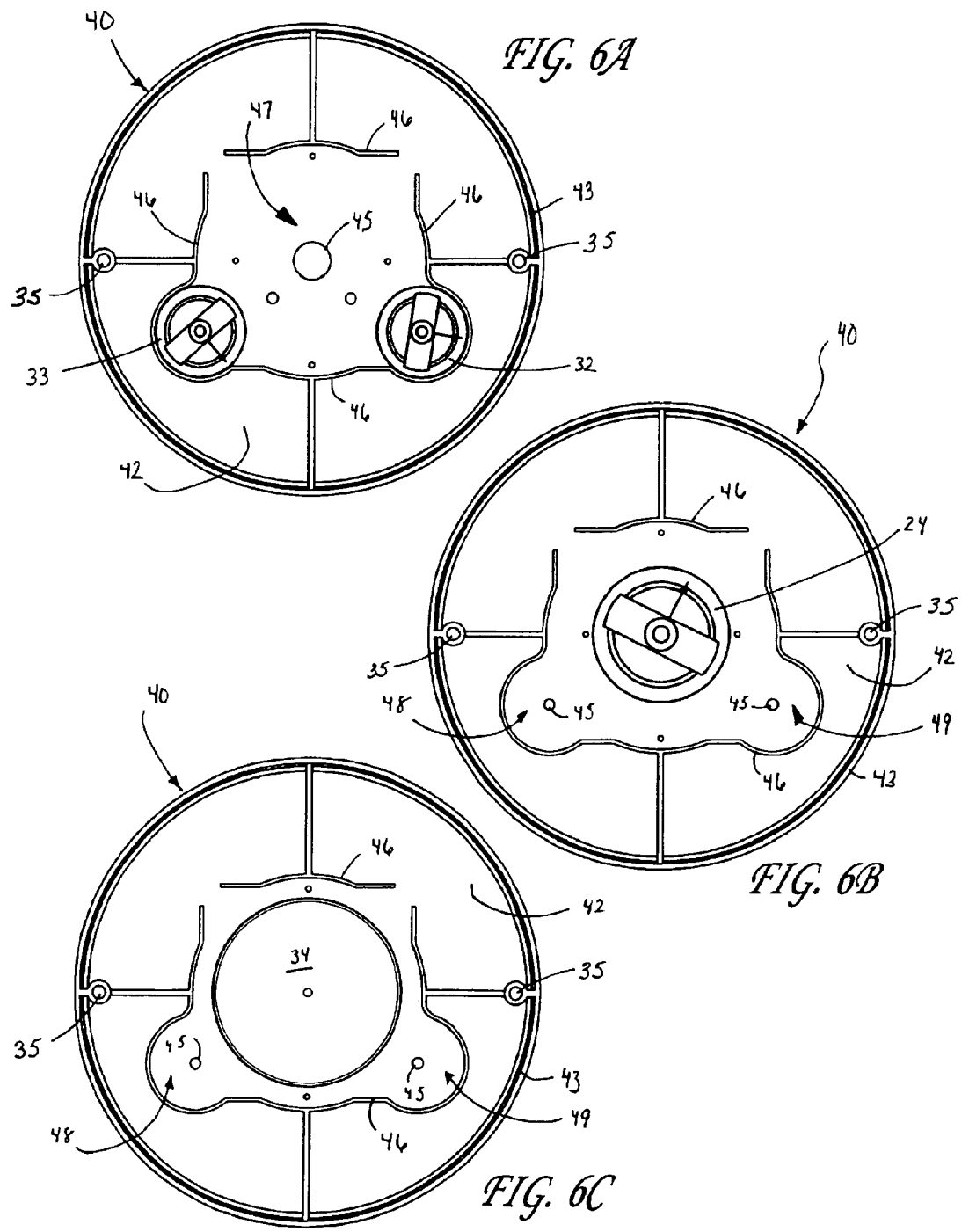

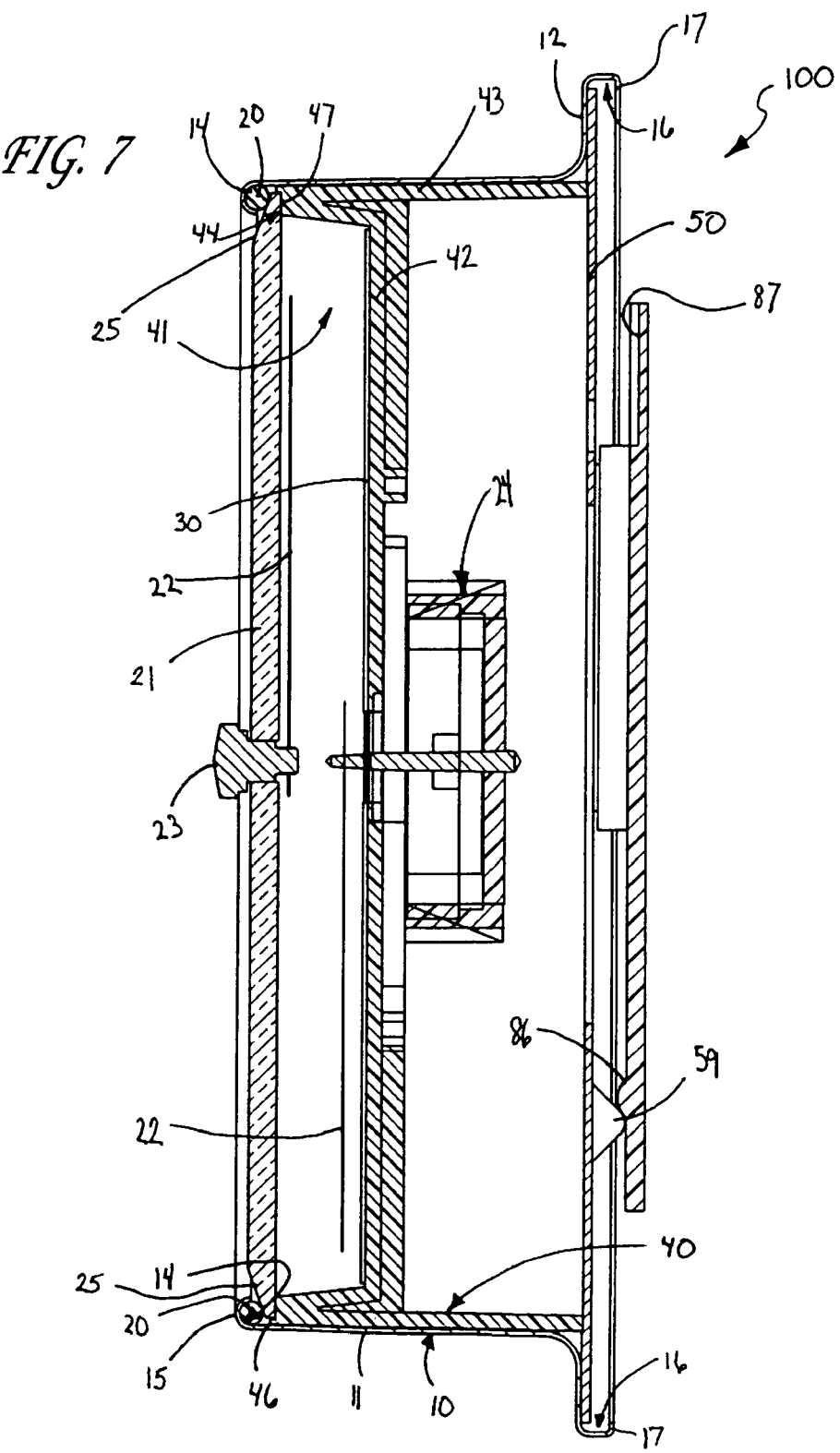

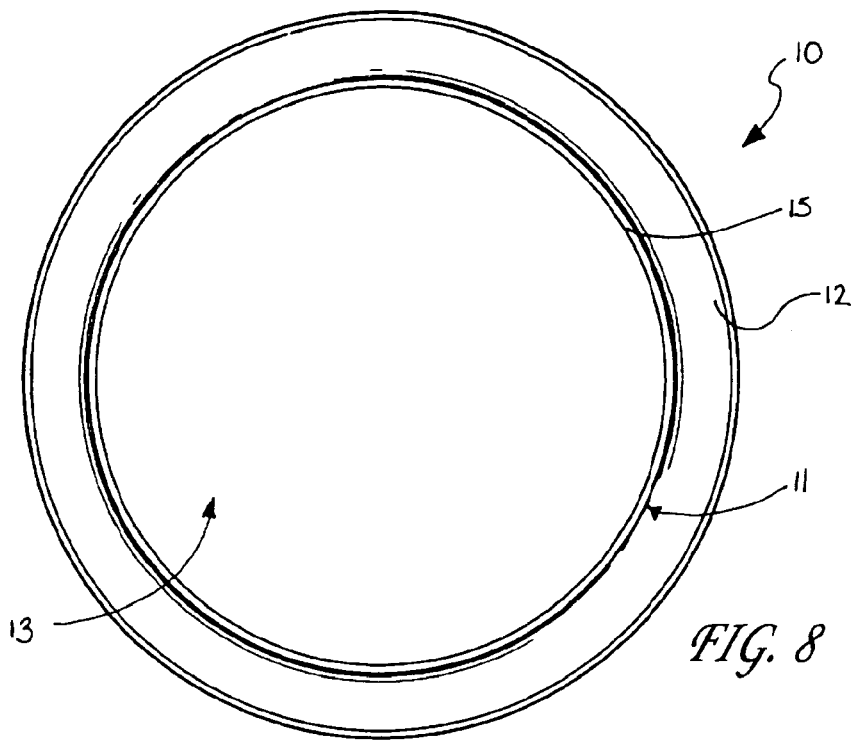
FIG. 8
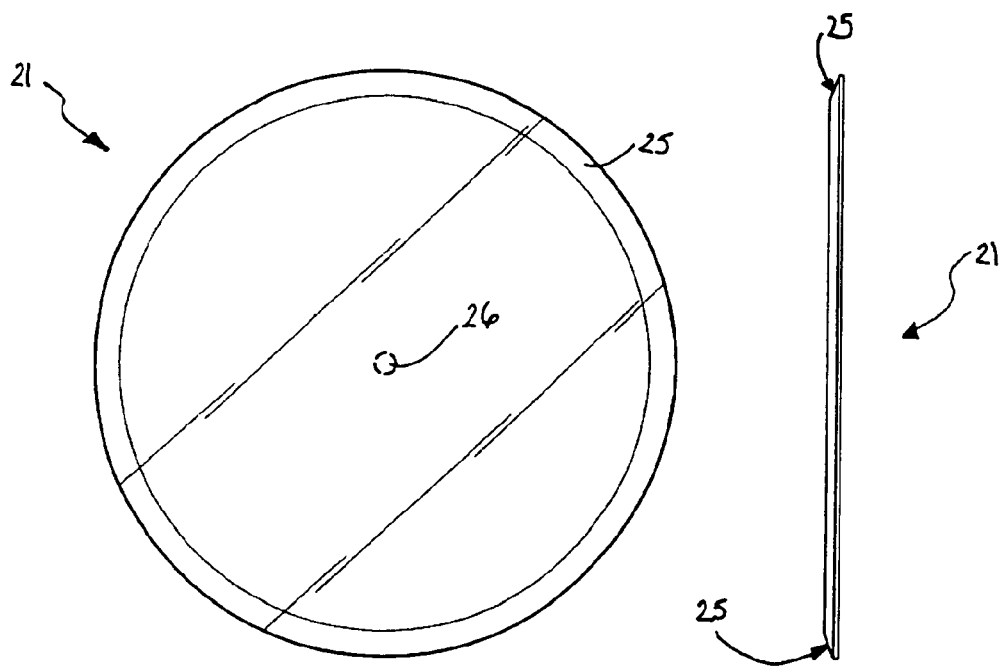
FIG. 9A
FIG. 9B

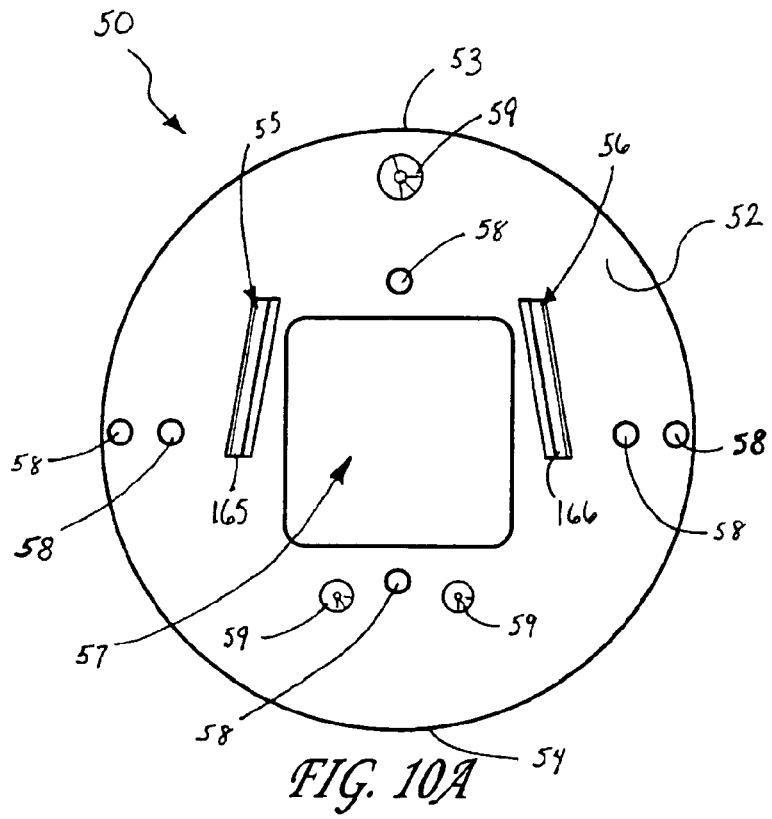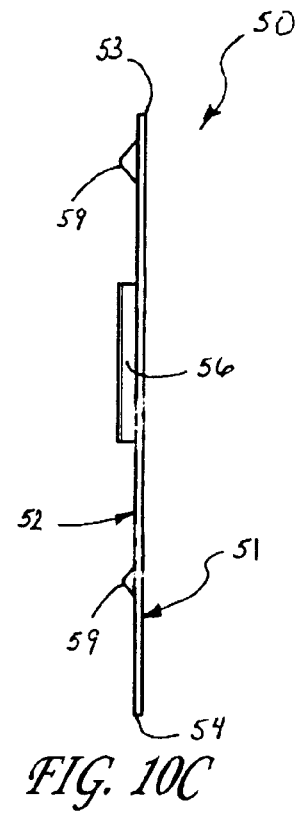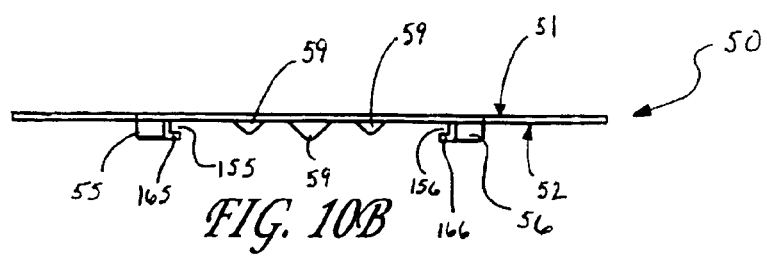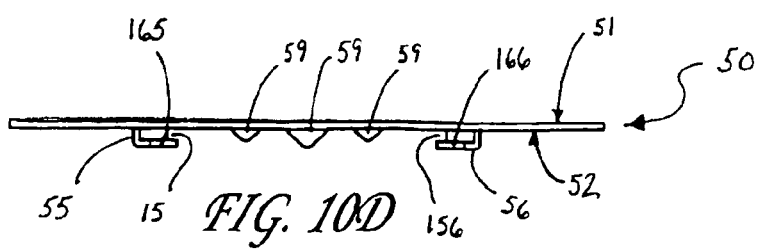

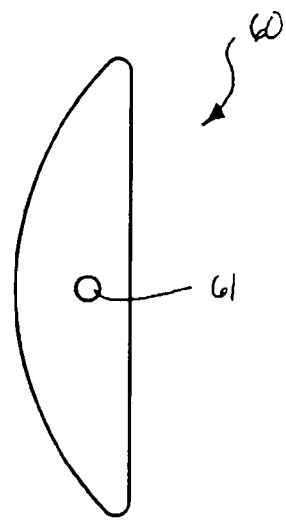
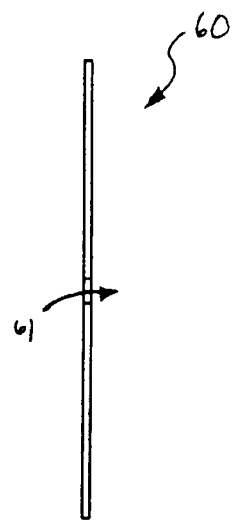
*FIG. 11A*  *FIG. 11B*
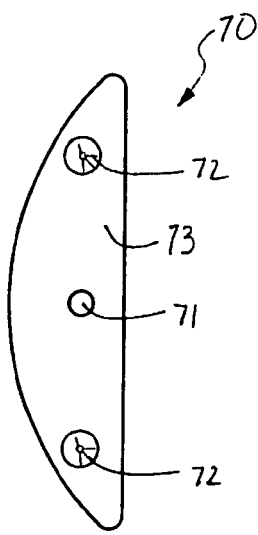
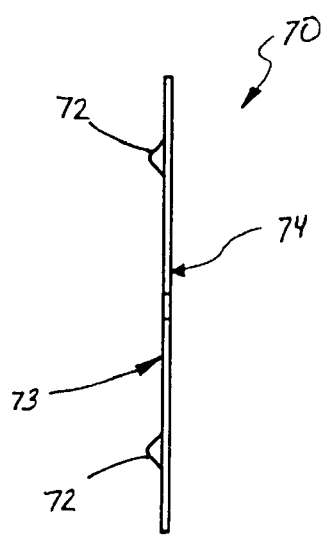
*FIG. 12A*  *FIG. 12B*

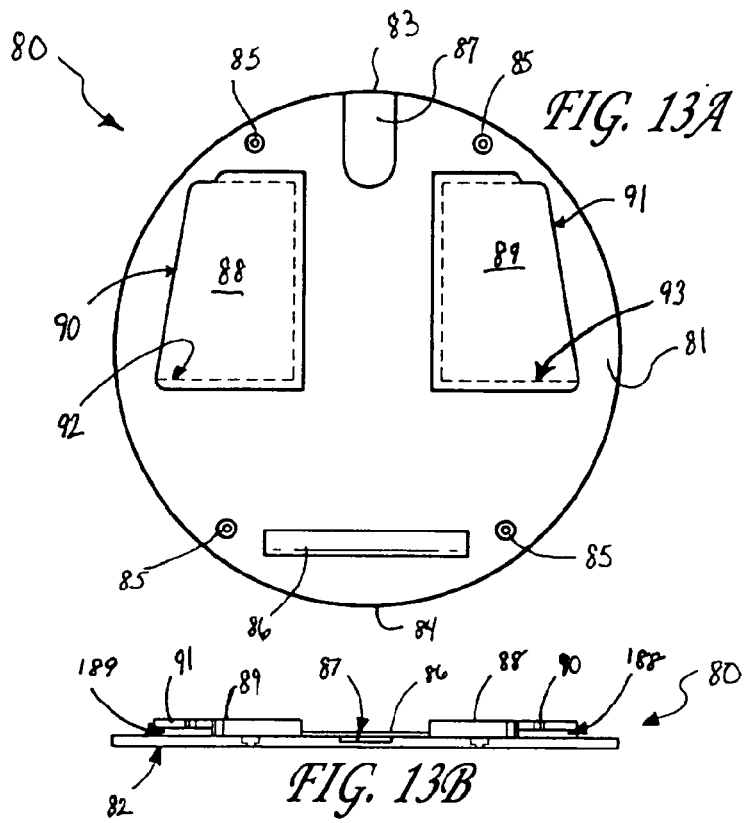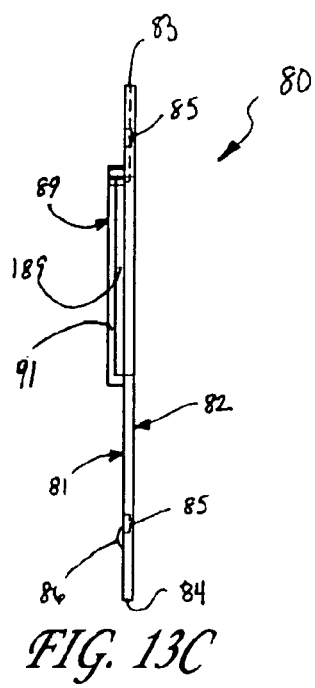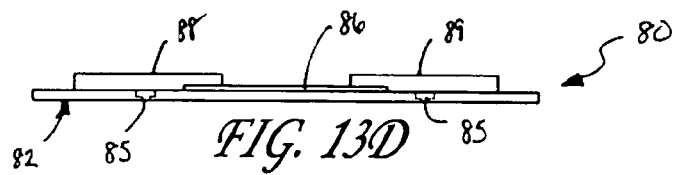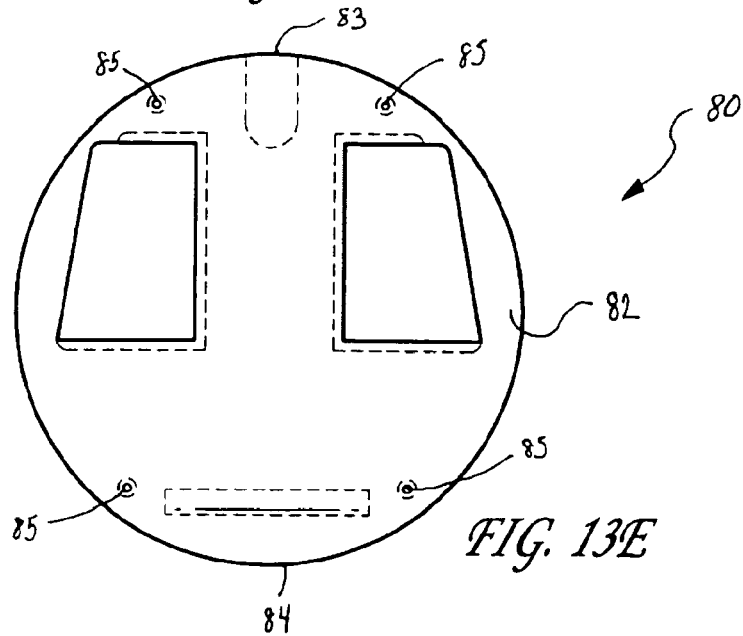

NAUTICAL INSTRUMENT

CROSS-REFERENCE TO RELATED PATENT APPLICATIONS

The present application is a continuation of U.S. Non-Provisional patent application Ser. No. 11/874,894, filed Oct. 18, 2007, issued as U.S. Pat. No. 8,381,585, which is a continuation of U.S. Non-Provisional patent application Ser. No. 11/429,388, filed May 5, 2006, issued as U.S. Pat. No. 7,293,456.

FIELD OF THE INVENTION

The present invention relates generally to the field of nautical instruments and, specifically to nautical instruments having a mounting system that facilitates repetitive removal and re-mounting of the nautical instrument to a surface within a ship without the use of tools.

BACKGROUND OF THE INVENTION

A host of equipment, electronic devices, instruments, and gauges are used on ships, such as clocks, barometers, radio control clocks, comfort meters, tide clocks, temperature gauges, etc. It is often desirable for many of these nautical instruments to be mounted to a surface within the ship, such as a control deck, bulkhead, or other surface, during use.

In existing instruments, mounting is typically achieved by extending screws or bolts through holes in the casing of nautical instrument and into the desired surface. Such nautical instruments are undesirable in that the mounting requires the use of a tool, such as a screwdriver or wrench. Moreover, the screws or bolts are visible from the front face of the instruments, resulting in a less pleasing aesthetic appearance. Furthermore, securing the rear surface of the nautical instrument's housing directly against a surface of ship results in moisture and other possible contaminants getting trapped between the two. Trapped moisture and/or contaminants can negatively effect the accuracy and functioning of a nautical instrument. Finally, repetitive mounting and removal of such a nautical instrument damages the surface within the ship because the screws/bolts repetitively penetrate and make new holes in the ship's surface.

In other existing nautical instruments, mounting is achieved through the use of a bulky box-like casing in which the nautical instrument is inserted and locked into place. These box-like mounting systems, however, are less than optimal in that they occupy a lot of precious room in a ship's cabin. Moreover, such box-like mounting systems are not compatible with many instruments.

Some nautical instruments are designed to be mounted to the surface of a ship by utilizing a number of relatively inaccessible components that make removal of the instrument relatively burdensome. In still other instances, some nautical instruments are mounted on a lift bracket (or pedestal) located externally from the dashboard or desired mounting surface within the ship. Mounting on these brackets does not firmly secure the instrument to the ship. Further, the positioning of the device outside of flush alignment with a surface of the ship leaves the instrument exposed to damage by outside sources.

The above-noted deficiencies are compounded by the fact that it is oftentimes desirable to remove certain nautical instruments from the ship each and every time the user leaves his/her ship. For instance, some electronic nautical instruments allow the user to exchange information between the instrument and a personal computer. Generally, it is less burdensome to remove the instrument from the ship rather than move the computer onto the ship. Furthermore, in some cases, it may be desired to use a single nautical instrument with a number of different ships by transferring the instrument from one ship to another.

Most commonly, however, nautical instruments are removed from the ship to prevent theft of the device. Theft is of particular concern with unguarded boats docked in public marinas. Thus, a nautical instruments is required that facilitates easy removal and mounting of the nautical instrument in a ship.

An additional problem is that existing nautical instruments do not stand up well against the harsh conditions experienced on a ship. For example, existing brass nautical instruments tend to tarnish very easily, thereby reducing their aesthetic appeal considerably. Most brass cased nautical instruments are laquered for tarnish protection. However, most laquers that permit maximum brass luster offer minimal life protection and partially wear away or easily scratch and chip, thereby rendering the exposed brass vulnerable to oxidation. While polishing the instrument with certain chemicals provides short term restoration and further erosion of the brass, such a temporary fix is unsatisfactory.

Finally, many nautical instruments tend to lose their watertight attributes over time, which for obvious reasons, is undesirable.

SUMMARY OF THE INVENTION

It is therefore an object of the present invention to provide a nautical instrument that can be repetitively removed and mounted to a ship's surface without the use of tools and/or without damaging the mounting surface.

Another object of the present invention is to provide a nautical instrument that comprise a universal mounting system.

A further object of the present invention is to provide a nautical instrument that can be repetitively removed and mounted to a ship's surface in a secure manner that will not rotate with respect to and/or otherwise disengage from the ship's surface.

A still further object of the present invention is to provide a nautical instrument that can be slidably mounted to and disengaged from a ship's surface.

A yet further object of the present invention is to provide a nautical instrument that has increased watertight capabilities when mounted.

Still another object of the present invention is to provide a nautical instrument that provides a ventilation space between the instrument's back surface and the surface to which it is mounted.

Yet another object of the present invention is to provide a nautical instrument that minimizes and/or eliminates tarnishing.

Another object of the present invention is to provide a nautical instrument that can be mounted to a surface of a ship without any fasteners visible on the front face of the instrument.

These and other object are met by the present invention, which in one aspect, is a nautical instrument having a top and a bottom comprising: a housing containing a gauge; a back plate connected to the housing and having a rear surface; a bracket assembly protruding from the rear surface of the back plate, the bracket assembly comprising a downwardly extending overhang section that forms first and second channels between the overhang section and the rear surface of the back plate, the channels opposing one another in an angled orientation that diverges from the top to the bottom of the nautical instrument; a bulkhead plate comprising means for securing the bulkhead plate to a surface of a boat; a mounting plate assembly connected to a front surface of the bulkhead plate in spaced relation, the mounting plate assembly having first and second angled edges that substantially corresponds to the angled orientation of the channels; and wherein the mounting plate assembly is adapted so that the first and second angled edges slidably insert into the first and second channels of the bracket assembly respectively when the rear surface of the back plate is positioned adjacent to and above the front surface of the bulkhead plate and the back plate is lowered, thereby effectuating mating engagement of the mounting plate assembly and the bracket assembly.

In one preferred embodiment, the bracket assembly comprises a first bracket comprising the first channel and a second bracket comprising the second channel. The first and second channels will preferably form an upside-down truncated V-shaped configuration. In such an embodiment, it is further preferred that the mounting plate assembly comprise a first mounting plate comprising the first angled edge and a second mounting plate comprising the second angled edge.

In order to provide stable mounting, the nautical instrument preferably comprises a means for pressing the overhang section of the bracket assembly against the mounting plate assembly during the mating engagement. In other words, it is desired that the overhang section be maintained under force against the mounting plate assembly during the mating engagement. In one embodiment, one or more protrusions extending from the rear surface of the back plate and pressing against the front surface of the bulkhead plate can be utilized to achieve this goal. The protrusion can be generally conical or semi-ellipsoid in shape.

In order to prohibit rotational movement of the backplate (and the housing) with respect to the bulkhead plate, a horizontal ridge and a guide channel can be provided on the front surface of the bulkhead plate. In this embodiment, at least three protrusions can be provided on the rear surface of the back plate. The three protrusion are preferably arranged on the back plate in a triangular arrangement. During mating engagement, one of the protrusions will extend into the guide channel and the other two protrusions will slide over the horizontal ridge and snap-lock to the underside of the horizontal ridge. This arrangement also prohibits the back plate from becoming easily dislodged from the bulkhead plate in the upward direction.

In another embodiment, the locking of the backplate to the bulkhead plate with a pressing force can be achieved by providing first and second locking plates that are connected to the rear surface of the back plate. Preferably, the locking plates are spaced from one another and the bracket assembly is located between them. One or more protrusions can extend from each of first and second locking plates. In this embodiment, when the bulkhead plate is secured to a planar surface of a ship and the backplate is matingly engaged to the bulkhead plate (as described above), the protrusions on the locking plates contact and press against the planar surface of the ship, thereby providing a pressing force and maintaining the overhang section of the bracket assembly under force against the mounting plate assembly. As discussed below, this force can also be used to compress a gasket seal to hermetically seal the front face of the instrument.

In a preferred embodiment, first and second compression plates are positioned between the first and second locking plates and the back plate. The compression plates are preferably made of a rubber or plastic material. As with the protrusions on the backplate, the protrusions on the locking plates can be generally conical or semi-ellipsoid in shape.

Preferably, the nautical instrument further comprises a substantially transparent lens located within the housing. The lens preferably covers an opening in a front face of the housing. A gasket seal is preferably provided between the lens and the housing. The gasket seal, which can be an O-ring, is preferably located in a groove located on an inside surface of the front face of the housing. The front surface of the lens preferably has a beveled perimeter region against which the gasket seal is compressed.

In this embodiment of the nautical instrument, the compression plates that are located between the locking plates and back plate are preferably made of a material which is harder than the gasket seal. This ensures that the gasket seal is further compressed during the mounting of the nautical instrument by the force exerted by the protrusions on the locking plates.

In order to prohibit tarnishing, the housing is preferably constructed of zirconium plated brass. Finally, when the mounting plate assembly and the bracket assembly are matingly engaged, a ventilation space preferably exists between the rear surface of the back plate and the front surface of the bulkhead plate. The ventilation space allows air to circulate behind the nautical instrument, thereby preventing moisture and heat build-up.

In another aspect, the invention is a nautical instrument comprising: a housing containing a gauge; a back plate connected to the housing and having a top, a bottom and rear surface; a bracket assembly protruding from the rear surface of the back plate, the bracket assembly comprising a channel that is accessible from below the bracket assembly; a bulkhead plate comprising means for securing the bulkhead plate to a surface of a boat; a mounting plate assembly connected to a front surface of the bulkhead plate in a spaced relation, the mounting plate assembly having an edge that corresponds to the roof of the channel of the bracket assembly; and wherein when the rear surface of the back plate is positioned adjacent to and above the front surface of the bulk head plate and the back plate is lowered, the edge of the mounting plate assembly slidably inserts into the channel of the bracket assembly until the edge of the mounting plate assembly contacts the roof of the bracket assembly.

In yet another aspect, a nautical instrument comprising: a housing containing a gauge; a back plate connected to the housing and having a rear surface, a bottom, a top and vertical centerline; a first bracket protruding from the rear surface of the back plate on one side of the centerline and a second bracket protruding from the rear surface of the back plate on the opposite side of the centerline; each of the brackets forming an elongated channel that angles inwardly toward the centerline from the bottom toward the top of the back plate, the channels being accessible from below the brackets and have a roof; a bulkhead plate having a top, a bottom and a front surface and comprising means for securing the bulkhead plate to a surface; first and second mounting plates connected to a front surface of the bulkhead plate in a spaced relation, the first mounting plate having a lateral edge that angularly corresponds to the channel of the first bracket and the second mounting plate having a lateral edge that angularly corresponds to the channel of the second bracket; and the lateral edges being spaced from one another so that when the rear surface of the back plate is positioned adjacent to and above the front surface of the bulk head plate and lowered, the lateral edges of the first and second plates slidably insert into the channels of the first and second brackets respectively until the lateral edges of the first and second plates come into contact with the roofs of the channels of the first and second brackets.

It should be noted that the inventive nautical instrument can take on a variety of embodiments, incorporating any single one or any combination of the features described in the detailed description below. For example, in a further aspect, the invention can be a nautical instrument comprising a housing constructed of zirconium-plated brass. In a still further aspect, the invention can be nautical instrument comprising a lens having a beveled perimeter region and gasket seal compressed against the beveled region. In a yet further aspect, the invention can be a nautical instrument comprising a universal dial plate.

BRIEF DESCRIPTION OF THE DRAWINGS

FIG. 3A is a combined temperature and humidity indicia plate that can be incorporated into the nautical instrument of FIG. 1.

FIG. 3B is a barometric pressure indicia plate that can be incorporated into the nautical instrument of FIG. 1.

FIG. 3C is a clock indicia plate that can be incorporated into the nautical instrument of FIG. 1.

FIG. 6A is a rear view of the dial plate of the nautical instrument of FIG. 1 adapted for combined temperature and humidity measurement.

FIG. 6B is a rear view the dial plate of the nautical instrument of FIG. 1 adapted for barometric pressure measurement.

FIG. 6C is a rear view the dial plate of the nautical instrument of FIG. 1 adapted for time measurement.

FIG. 7 is a cross-sectional side view of the nautical instrument of FIG. 1 viewed along its vertical centerline.

FIG. 8 is a rear view of the housing of the nautical instrument of FIG. 1.

FIG. 9A is a front view of the lens of the nautical instrument of FIG. 1.

FIG. 9B is a side view of the lens of the nautical instrument of FIG. 1.

FIG. 10A is a rear view of the back plate of the nautical instrument of FIG. 1.

FIG. 10B is a top view of the back plate of the nautical instrument of FIG. 1.

FIG. 10C is a right side view of the back plate of the nautical instrument of FIG. 1.

FIG. 10D is a bottom view of the back plate of the nautical instrument of FIG. 1.

FIG. 11A is a rear view of the compression plates of the nautical instrument of FIG. 1.

FIG. 11B is a cross-sectional right side view of the compression plates of FIG. 11A.

FIG. 12A is a rear view of the locking plates of the nautical instrument of FIG. 1.

FIG. 12B is a cross-sectional right side view of the locking plates of FIG. 12A.

FIG. 13A is a front view of the bulkhead plate of the nautical instrument of FIG. 1.

FIG. 13B is a top view of the bulkhead plate of the nautical instrument of FIG. 1.

FIG. 13C is a right side view of the bulkhead plate of the nautical instrument of FIG. 1.

FIG. 13D is a bottom view of the bulkhead plate of the nautical instrument of FIG. 1.

FIG. 13E is a rear view of the bulkhead plate of the nautical instrument of FIG. 1.

DETAILED DESCRIPTION OF THE DRAWINGS

An embodiment of the inventive nautical instrument 100 will now be described in relation to FIGS. 1-13E. Throughout the description of the figures, like numbers are used to refer to like elements. While an embodiment of the invention will be described, the embodiment is in no way limiting of the present invention and various modifications and embodiments of the invention exist. The true scope of the invention is to be determined by the claims.

Figure 1:
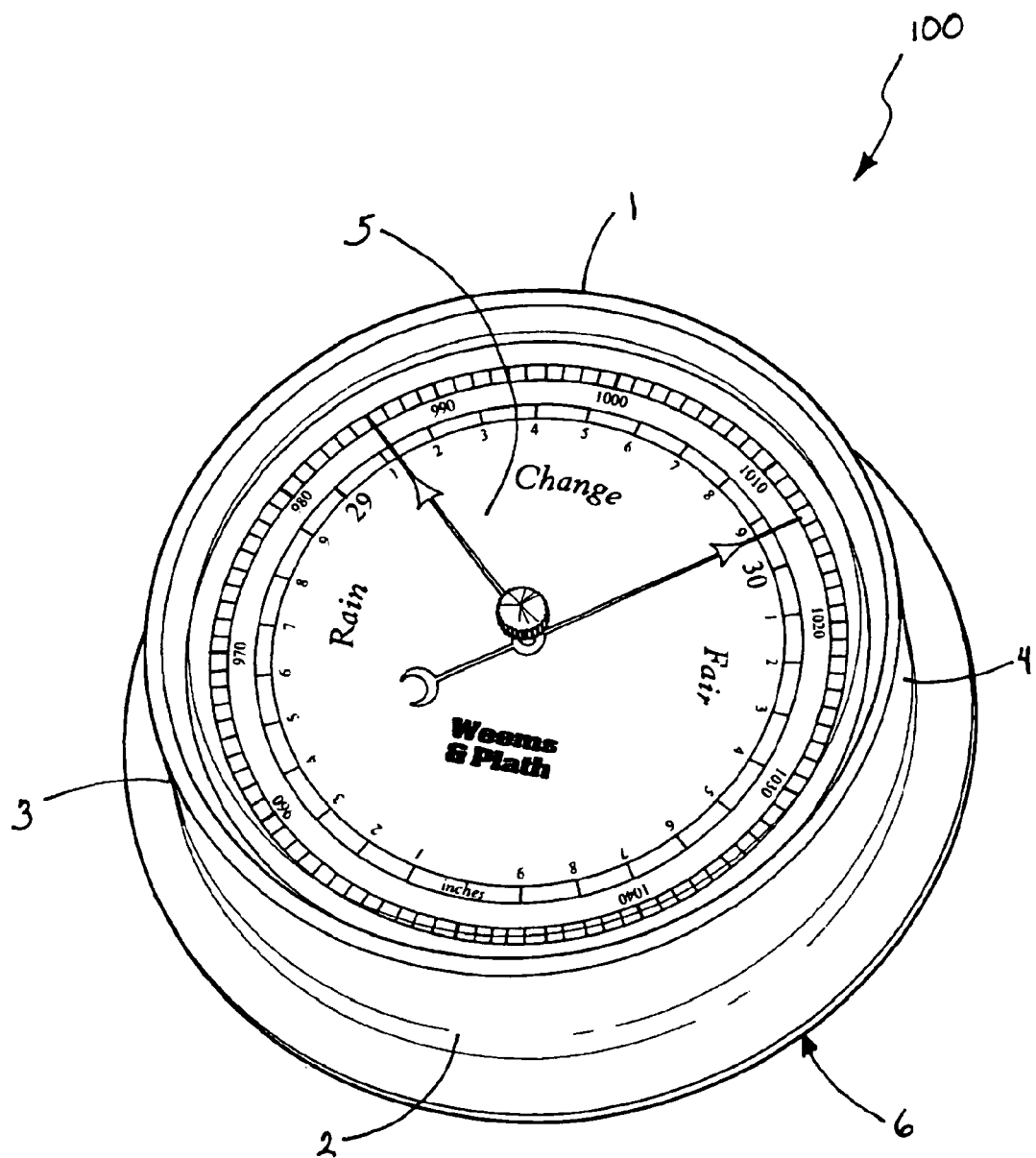
FIG. 1 is a bottom perspective of a nautical instrument according to an embodiment of the present invention.

FIG. 1 is a bottom perspective view a nautical instrument 100 according to an embodiment of the present invention. While the nautical instrument 100 is a barometer, the invention is not limited to any specific type of nautical instrument. For example, the inventive nautical instrument 100 can take on a variety of functions, including without limitation radio control clocks, comfort meters, tide clocks, hygrometers, and any combination thereof. As will be discussed in greater detail below, the functioning of the inventive nautical instrument can be altered by merely changing the interior measuring components, the indicia plate, and the dials.

The nautical instrument 100 is illustrated as being circular in shape but can take on any shape desired. Similarly, the nautical instrument 100 can take on any desired size. The nautical instrument 100, as illustrated in FIG. 1, is fully assembled. The nautical instrument 100 has a top 1, a bottom 2, a left side 3, a right side 4, a front 5 and a rear 6. As the various components of the nautical instrument 100 are described below, reference to the top, bottom, front and rear of any component will correspond to the top 1, bottom 2, front 5 and rear 6 of the nautical instrument 100 in general orientation.

Figure 2:
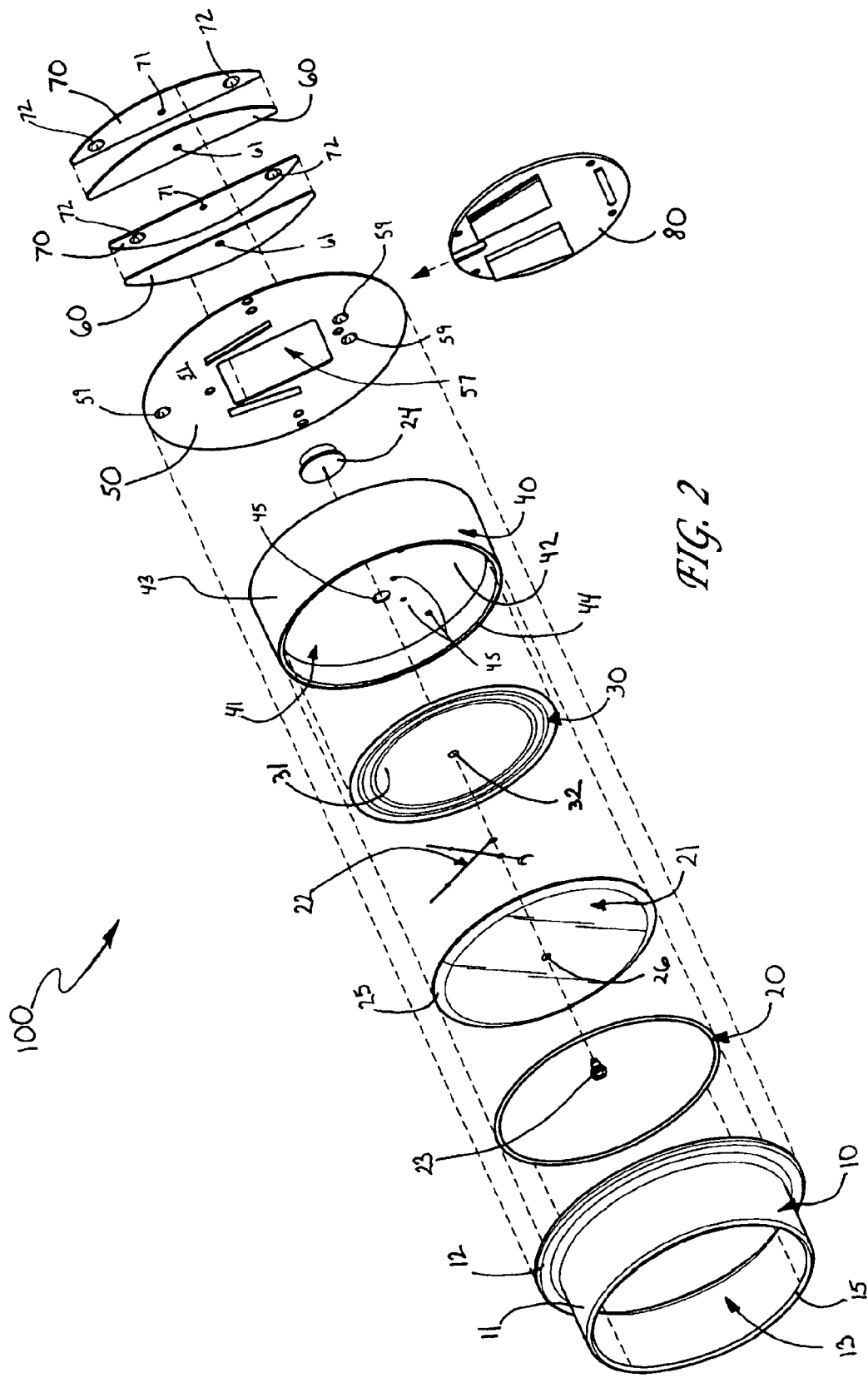
FIG. 2 is an exploded view of the nautical instrument of FIG. 1.

Referring now to FIG. 2, the nautical instrument 100 is shown in an exploded fashion so that its major components are visible. The components of the nautical instrument 100 are assembled in the order in which they are arranged. The nautical instrument 100 comprises a housing 10, an O-ring 20, a transparent lens 21, dials 22, a knob 23, a gauge mechanism 24, an indicia plate 30, a dial plate 40, a back plate 50, compression plates 60, locking plates 70, and a bulkhead plate 80. Each of these components will first be described in detail with a discussion of their assembly and interaction to follow.

Referring to FIGS. 2 and 8 concurrently, the housing 10 is a casing comprising a wall portion 11 and a flange 12. The flange 12 surrounds the wall portion 11 at the rear of the housing 10. At its front face, the wall portion 11 of the housing terminates in a curved edge 15. As will be discussed below, the curved edge 15 forms a groove 14 (FIG. 7) on the inner surface of the housing 10 for receiving the O-ring 20. The front face of the housing 10 also comprises an opening 13. The opening 13 acts as the viewing area of the nautical instrument 100 so that the dials 22 can be read.

The housing 10 can be made of any material, however, it is preferred that the housing 10 be constructed of brass. It has been discovered that coating the brass housing with zirconium is effective to prevent tarnishing, discoloration and/or any type of corrosion. The brass can be plated with zirconium via an electro-plating procedure. Zirconium plating has been discovered to be extremely resistant to wear and does not require the application of lacquer. Restorative polishing of the zirconium plating restores the entire surface of the housing as opposed to the patchwork of lacquering the surface.

The O-ring 20 is designed to fit in the housing 10 and is sized to fit in the groove 14 formed by the curved edge 14 (this will be discussed in greater detail below with respect to the assembly of the nautical instrument 100 in FIG. 7). Proper compression of the O-ring 20 within the groove results in the front face of the nautical instrument 100 being watertight and weatherproof. While an O-ring 20 is illustrated, other types of seals may be used. The O-ring 20 may be made of a silicone rubber material.

Referring now to FIGS. 2, 9A and 9B concurrently, the lens 21 is constructed of a transparent material such as glass, crystal, plastic, etc. Preferably, a mineral glass is used. The lens 21 comprises a beveled perimeter region 25 and a center hole 26. The lens 21 is sized to fit within the wall portion 11 of the housing 10 so that the beveled perimeter region 25 contacts and compresses the O-ring 21 within the groove 14 formed by the curved edge 15 of the housing 10. The center hole 26 acts as a passageway for the knob 23 which is to be connected to one of the dials 22. Proper rubber rings/seals can be used to make the center hole 26 watertight. In some embodiments of the inventive nautical instrument 100, it is not necessary to include the center hole 26. Whether or not to include the center hole 26 is dictated by the type of nautical instrument being created. For example, the center hole is not necessary for a clock.

The indicia plate 30 comprises the markings necessary to read the standard being measured by the nautical instrument 100. As mentioned above, the indicia plate 30 can take on a wide variety of embodiments. For example, in FIGS. 3A-3C, the indicia plates 30A-30C are illustrated for combined temperature and humidity, barometric pressure and time measurements respectively. The exact location and indicia added to the front surface 31 of the indicia plate 30 will be dictated by the desired functionality of the nautical instrument 100 into which it is to be incorporated.

Referring again to FIG. 2, the front surface 31 of the indicia plate 30 (which includes the indicia) faces the lens 21 so that it is visible through the opening 13 of the housing 10 when the nautical instrument 100 is assembled. The indicia plate 30 comprises the necessary holes 32 (one illustrated) for connection of the dials 22 to the gauge mechanism 24. The number and positioning of the holes 32 is dictated by the type of nautical instrument 100 designed. The indicia plate 30 is sized so that it fits within the cavity 41 of the dial plate 40. The indicia plate 30 can be adhered or otherwise connected to the floor 42 of the cavity 41 of the dial plate 40 if desired. In another embodiment, the indicia plate can be pressed into position within the cavity 41.

The indicia plate 30 is preferably formed of an opaque material, such as rigid PVC or polystyrene. The indicia plate can be die cut or pierced from a blank. The indicia plate 30, however, can be made from a wide variety of materials.

Referring still to FIG. 2, the dial plate 40 will now be described. The dial plate 40 comprises a wall portion 43 that terminates in a ring-like edge 44. The ring-like edge 44 forms the perimeter of the cavity 41. The cavity 41 comprises a floor 42 upon which the indicia plate 30 can rest. The wall portion 43 of the dial plate 40 is sized and shaped to fit within the housing 40. It is accurately matched to the taper of the brass housing 10 with the proper clearance for thermal cycling.

The dial plate 40 is also sized and shaped so that the lens 21 will rest atop the ring-like edge 44 when assembled, thereby substantially enclosing the cavity 41. In order to facilitate proper placement of the lens 21 on the dial plate 40, the ring-like edge 44 comprise a raised edge 46 about its perimeter thereby forming an internal ledge 47 upon which the lens 21 can rest (illustrated in FIG. 7). The raised edge 46 acts as a self-guiding wall during assembly of the lens 21 to the dial plate 40 and restricts the lens 21 from sliding off the edge 44. If desired, the lens 21 can be sealed to the dial plate 40 by applying a wet adhesive on the ledge 47 and positioning the lens 21 thereon. Using an adhesive also provides additional moisture sealing for the internal components of the nautical instrument 100.

The dial plate 40 is designed so that it is a multi-purpose and universal component that can be used in any nautical instrument 100 of the present invention, irrespective of the instrument's ultimate end functioning as a barometer, temperature gauge, comfort meter, tide clock, etc. To this extent, the dial plate comprises a plurality of holes 45 that extend through the floor 42 of the cavity 41. The holes 45 provide passageways from the rear of the dial plate 40 to the cavity 41 so that the appropriate dials 22 can be operably coupled to the appropriate gauge mechanism 24 (or mechanisms) which are nested in the rear of the dial plate 40 behind the floor 42. Depending on the desired end functioning of the nautical instrument 100, one or more of the holes 45 may not be used. Unused holes 45 may simply be covered up by the indicia plate 30.

Referring now to FIGS. 6A-6C, the rear of the dial plate 40 is illustrated having three different gauge mechanism arrangements. In FIG. 6A, the dial plate 40 is fitted with a temperature gauge mechanism 32 and humidity gauge mechanism 33. In FIG. 6B, the dial plate 40 is fitted with a barometric pressure gauge mechanism 24. In FIG. 6C, the dial plate 40 is outfitted with a clock gauge mechanism 34. Thus, as can be seen, the dial plate 40 enables visual presentation of a multitude of accurately pre-printed indicia plates 30 in a wide range of suitable materials.

The universal nature of the dial plate 40 is facilitated by the specially designed internal walls 46 that extend from the rear surface of the floor 42 of the dial plate 40. The internal walls 46 are sized and shaped to: (1) accommodate the various gauge mechanisms 24 and 32-34; (2) hold the various gauge mechanisms 24 and 32-34 in place and maintain their proper orientation; and (3) properly align the various gauge mechanisms 24 and 32-34 with the desired holes 45 so that the dials 22 can be operably connected thereto.

As illustrated, the internal walls 46 of the dial plate 40 form three nesting areas 47-49. The nesting area 47 is a central nesting area designed to accommodate centrally located gauge mechanisms, such as a clock or barometer. The central nesting area 47 can accommodate larger gauge mechanisms. The lower nesting areas 48, 49 are formed by two semispherical portions of the internal wall 46 and are located so that two gauge mechanisms can be accommodated by the dial plate 40 simultaneously. The internal walls 46 provide quick and accurate fixation of the gauge mechanisms to the dial plate 40.

Therefore, the dial plate 40 is a universal component that facilitates the mounting of a multiplicity of different gauge mechanisms for measuring various standards. The dial plate 40 allows different nautical instruments to be constructed from a common case system, thereby economically extending the application of the invention.

The dial plate 40 further comprises threaded bores 35 for receiving and engaging screws that penetrate the back plate 50, the compression plates 60 and the locking plates 70. The threaded bores 35 are formed into the internal walls 46 of the dial plate 40 near the wall portion 43 at about 180 degrees apart. As such, the dial plate 40 locates and centers the back plate 50 to ensure correct alignment with the internal mechanisms and dial legend on the indicia plate 30.

The dial plate 40 is preferably a single-piece structure constructed of ABS plastic. The dial plate 40 can be formed by injection molding or other techniques. The invention, however, is not limited to any specific material and/or technique of construction. All of the holes in the dial plate 40 can be formed by lathing, boring, trepanning, or press piercing after molding. Rubber washers can be used to seal any of the holes in the dial plate 40 if desired.

Referring back to FIG. 2, the nautical instrument also comprises a gauge mechanism 24 for measuring a desired standard, such as time, humidity, temperature, etc. The gauge mechanism 24 comprises a needle 36 (or other extension) that protrudes through the dial plate 40 so that one or more of the dials 22 can be connected thereto. The mounting of the gauge mechanism 24 in the dial plate 40 is discussed above and, thus, will not be further described in order to avoid redundancy. It should be noted that the invention is not limited by the structure and/or functioning of the gauge mechanism 24. The inventive nautical instrument 100 can incorporate any and all types of gauge mechanisms.

Referring now to FIGS. 2 and 12A-12B concurrently, the nautical instrument 100 further comprises two D-shaped locking plates 70. Each of the locking plates 70 comprises a hole 71 extending therethrough and two protrusions 72 protruding from the rear surface 73 of the locking plates 70. The holes 71 provide a means by which the locking plates 70 can be secured the back surface of the back plate 50 by a screw or other fastener. The protrusions 72 are similar to those discussed below with respect to the back plate 50.

The locking plates 70 are preferably made of stainless steel or another suitably hard material. The protrusions 72 on the locking plates 70 can be formed by performing a punching-to-dimple technique to the front surface 74 of the locking plates 70 while the holes 71 are formed by a punching-to-pierce technique.

Referring now to FIGS. 2 and 11A-11B concurrently, the nautical instrument 100 further comprises two D-shaped compression plates 60. Each of the compression plates 60 comprises a hole 61 extending therethrough. The holes 61 provide a means by which the compression plates 60 can be secured the rear surface 52 of the back plate 50 by a screw b or other fastener.

The compression plates 60 are preferably formed of a material having a thickness and shore hardness that ensures appropriate rear assembly compression and security of the internal parts of the nautical instrument 100. Most preferably, the compression plates 60 are formed of a material that has the same or higher hardness rating than the material of the O-Ring 20. As will be discussed below, this achieves maximum compression of the O-ring 20 between the lens 21 and the housing 10 during mounting.

In one embodiment, the compression plates 60 are formed from a rubber, a plastic or a synthetic flexible polymer. The compression plates 60 can be die cut with a knife tool, molded or pierced from a blank of material.

Referring still to FIG. 2, the nautical instrument 100 further comprises a back plate 50. While the back plate 50 is illustrated as being a separate structure than that of the housing 10, in some embodiments of the invention, the back plate 50 will be integrally formed as part of the housing 10. The back plate 50 connects to the rear of the housing 10 so as to substantially enclose the back side of the housing 10. The back plate 50 is preferably constructed of galvanized steel and powder coated and formed by a die cutting or piercing technique.

As will be discussed in greater detail below, the back plate 50 (in combination with the bulkhead plate 80) is specially designed to facilitate a novel mounting technique for the nautical instrument 100.

Referring now to FIGS. 10A-10D, the back plate 50 comprises a front surface 51, a rear surface 52, a top 53 and a bottom 54. The top 53 and bottom 54 of the back plate 50 correspond to the top 1 and bottom b of the nautical instrument 100. The back plate 50 comprises a rectangular cutout 57 near the center of the back plate 50. The cutout 57 provides a passageway through the back plate 50 so that the internal components of the nautical instrument 100 are accessible to a user.

The back plate further comprises a plurality of holes 58 extending through the back plate 50. The holes 58 provide a means by which the back plate 50 can be secured to the dial plate 40 via screws 95, etc. Two of the holes 58 are positioned so as to be aligned with the bores 35 of the dial plate 40. During assembly, screws 95 pass through these two holes 58 and into the bores 35 of the dial plate 40, thereby securing/connecting the back plate 50 to the dial plate 40 (and the housing 10).

The back plate 50 further comprises three generally conical-shaped protrusions 59 extending from the rear surface 52 of the back plate 50. The protrusions 59, however, are nor limited to any specific shape. The protrusions 59 are formed by punching the front surface 51 of the back plate 50 so as to form dimples therein. The dimples of the front surface 51 of the back plate 50 appear as protrusions on the rear surface 52 of the back plate 50.

The protrusions 59 are located in a generally triangular pattern. One protrusion 59 is located near the top 53 of the back plate 50 along the vertical centerline of the back plate 50 while the other two protrusions 59 are located below the cutout 57 in a horizontally aligned and spaced relation. All of the protrusions 59 are located closer to the vertical centerline of the back plate 50 than are the first and second brackets 55, 56. Most preferably, the protrusion 59 near the top 53 of the back plate 50 is slightly larger than the two lower protrusions 59. As a result, the protrusion 59 near the top 53 protrudes further from the rear surface 52 of the back plate than do the two lower protrusion 59 (i.e., it has a greater height).

The back plate 50 further comprises a bracket assembly which comprises a first bracket 55 and a second bracket 56. It should be noted that while the bracket assembly is illustrated as a two-piece structure, in some embodiments of the invention the bracket assembly will be a single structure. The brackets 55, 56 can be formed by punching the blank material of the back plate 30 on three sides, bending the material outward and then angling the material to form the overhang portions 165, 166. Each of the first and second brackets 55, 56 have a substantially L-shaped cross-sectional configuration. The invention, however, is not so limited and the brackets 55, 56 can take on an almost endless variety of shapes and configurations.

The first and second brackets 55, 56 extend from the rear surface of the back plate 50. The first bracket 55 is located on one side of the vertical centerline of the back plate 50 while the second bracket 56 is located on the opposite side of the vertical centerline. The first and second brackets 55, 56 are oriented in an angled fashion so as to diverge from one another going from the top 53 to the bottom of the 54 of the base plate 50. In one embodiment, the first and second brackets 55, 56 are at a 10 degree offset angle from the vertical centerline of the back plate 50. In this manner, the first and second brackets 55, 56 form an upside-down truncated V-shaped assembly.

The first bracket 55 forms a first channel 155. Similarly, the second bracket 56 forms a second channel 156. The first channel 155 is formed between the overhang portion 165 of the first bracket 55 and the rear surface 52 of the base plate 50. The second channel 156 is formed between the overhang portion 166 of the second bracket 56 and the rear surface 52 of the base plate 50. As a result, the first channel 155 and the second channel 156 oppose one another in a spaced and angled relation (identical to that of the brackets 55, 56 themselves).

The channels 155, 156 are accessible from the bottom 54 of the back plate 50 (i.e., from below the bracket assembly). Each of the channels 155, 156 comprises a roof 175, 176. In the aggregate, the first and second channels brackets 55, 56 form an upside-down truncated V-shaped channel. In alternate embodiments, the bracket assembly can form a single or segmented channel that has an upside-down substantially U-shaped or semi-elliptical configuration.

Referring solely to FIG. 2, the nautical instrument 100 further comprises a bulkhead plate 80. The bulkhead plate 80 cooperates with the back plate 50 to effectuate the novel mounting and locking of the nautical instrument 100 to a wall or other surface of a ship. Generally, the bulkhead plate 80 is secured to the desired surface of the ship and the remaining components of the nautical instrument 100 are slidably mounted to the bulkhead plate 80.

Referring now to FIGS. 13A-13E, the bulkhead plate 80 comprises a front surface 81, a rear surface 82, a top 83 and a bottom 84. The top 83 and bottom 84 of the bulkhead plate 80 corresponds to the top 1 and bottom 2 of the nautical instrument 100 (FIG. 1).

The bulkhead plate 80 comprises a plurality of mounting holes 85 extending through the back plate 50. The mounting holes 85 provide a means by which the bulkhead plate 80 can be secured to a wall or other surface of a ship via screws, bolts, etc. The mounting holes 85 are of a counter bored shape (i.e., stepped). By making the mounting holes 85 a counter bored shape, the mounting holes 85 facilitate accurate marking and drilling for mounting the bulkhead plate 80. As a result, the mounting plate 80 itself acts as its own drill jig/template. The mounting holes 85 enlarge as the mounting screws are inserted. The bulkhead plate 80 also comprises location markers (not illustrated) to enable the bulkhead plate 80 to act as an installation marker.

A horizontal ridge 86 is provided on the front surface 81 of the bulkhead plate 80. The horizontal ridge 86 is a raised elongated feature that has a semi-circular cross-sectional profile. The horizontal ridge 86 is located near the bottom 84 of the bulkhead plate 80. The horizontal ridge 86 acts as a retaining element for the two lower protrusions 59 of the back plate 50 during the novel mounting procedure. The height and cross-sectional profile of the horizontal ridge 86 is chosen so that the two lower protrusions 59 of the back plate 50 slide over and snap lock against the underside of the horizontal ridge 86 during the sliding mounting procedure (as illustrated in FIG. 7).

The bulkhead plate 80 further comprises a guide channel 87 in its front surface 81. The guide channel 86 is a vertically oriented depression that extends downwardly from the top edge of the bulkhead plate 80. The guide channel 87 does not extend through the entire thickness of the bulkhead plate 80 (i.e., from the front surface 81 to the rear surface 82). The depth of the guide channel 87 is determined on a design basis. As will be discussed below, the guide channel 87 is provided to receive, guide and laterally restrain the top protrusion 59 of the back plate 50 during mounting.

The bulkhead plate 80 further comprises a mounting plate assembly which comprises a first mounting plate 88 and a second mounting plate 89. The mounting plates 88, 89 utilize a dovetail design. It should be noted that while the mounting plate assembly is illustrated as a two-piece structure, in some embodiments of the invention, the mounting plate assembly will be a single structure. Each of the first and second mounting plates 88, 89 are connected to the front surface 81 of the bulkhead plate 80 in a spaced relation from each other and the front surface 81. As a result, spaces 188, 189 are formed between the mounting plates 88, 89 and the front surface 81 of the bulkhead plate 80.

Each of the first and second mounting plates 88, 89 are connected to the bulkhead plate 80 along three sides. The first mounting plate 88 comprises a first angled edge 90 and the second mounting plate 89 comprises a second angled edge 91. The first and second angled edges 90, 91 are not connected to the bulkhead plate 80, thereby allowing a passageway into the spaces 188, 189 that exist between the mounting plates 88, 89 and the front surface 81 of the bulkhead plate 80.

The first and second angled edges 90, 91 diverge from one another from the top 83 to the bottom 84 of the bulkhead plate 80. The angled orientation of the first and second angled edges 90, 91 is designed to correspond to the angled orientation of the first and second channels 155, 156 of the bracket assembly of the back plate 50. This facilitates the mating engagement of the mounting plate assembly and the bracket assembly. By angling the edges 90, 91 of the mounting plates 88, 89 in a manner that corresponds to the angled orientation of the channels 155, 156 of the brackets 55, 56, the edges 90, 91 of the mounting plates 88, 89 can slidably insert into the channels 55, 56. Thought of another way, the overhang portions 165, 166 of the brackets 55, 56 slide into the spaces 188, 189 that exist between the mounting plates 88, 89 and the front surface 81 of the mounting plate 80. Either way, a mating engagement occurs.

A floor 92, 93 exists at the bottom of each angled edge 90, 91 and prohibits excessive downward movement of the brackets 55, 56 during the mating engagement. The angled edges 88, 89 are unobstructed at their tops to allow entry into the channels 155, 156. The first and second mounting plates 88, 89 are spaced from one another so that that they fit between the brackets 55, 56. The first mounting plate 88 is located on one side of the vertical centerline of the bulkhead plate 80 while the second mounting plate 89 is located on the opposite side of the vertical centerline.

The bulkhead plate 80 can be formed of a wide variety of materials, including plastic, nylon, metals, or other materials. In one embodiment, the bulkhead is formed by injection molded nylon.

Referring now to FIGS. 2 and 7 concurrently, the assembly of the nautical instrument 100 and the interaction of its components will be discussed. When the nautical instrument 100 is assembled, the O-ring 20 is first placed in the groove 14 formed by the curved edge 15 of the housing 10.

The appropriate indicia plate 30 and dial(s) 22 are positioned within the cavity 41 of the dial plate 40. The appropriate gauge mechanism(s) 24 are also inserted into the proper nesting area in the rear of the dial plate 40 and operably coupled to the dial(s) 22.

The lens 21 is then placed atop the ring-like edge 44 of the dial plate 40. The lens 21 rests atop the ledge 47 formed by the raised edge 46. If desired, the lens 21 can be sealed to the dial plate 40 by applying a wet adhesive between the ledge 47 and the lens 21. This "dial plate and lens assembly" is then inserted into the housing 10 so that the beveled portion 25 of the lens 21 is pressed against the O-ring 20, thereby creating a hermetic seal. As will be discussed in greater detail below, the bulkhead plate 80, the back plate 50 and locking plates 70 are designed to apply an additional compression force to the silicon rubber O-ring 20 when the nautical instrument 100 is mounted to the surface of a ship, thereby increasing the watertight characteristics of the front face of the instrument.

The knob 23 is then inserted into the hole 26 of the lens 21 and coupled to a dial 22 if needed. A rubber seal can be provided between the knob 23 and the lens 21 to maintain the weatherproof integrity of the front face of the nautical instrument 100.

The back plate 50 is connected to the dial plate 40 via two screws 95 (FIG. 5) that penetrate into the threaded bores 35 (FIG. 6A) of the dial plate 40. The back plate 50 is connected to the housing 10 by a sized fit into a groove 16 formed by the curved rear edge 17 of the flange 12 of the housing 10.

Figure 5:
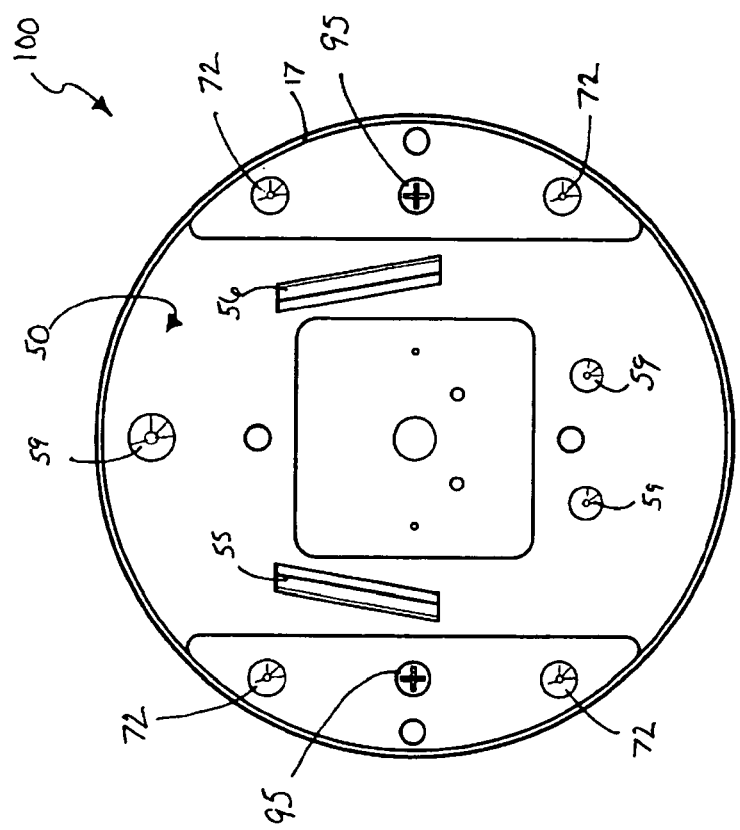
FIG. 5 is a rear view of the nautical instrument of FIG. 1.

Referring now to FIG. 5, the locking plates 70 and the compression plates 60 are also connected to the back plate 50 via the screws 95. The compression plates 60 are located between the locking plates 70 and the back plate 50. Each screw 95 penetrates the locking plate 70, the compression plate 60, the back plate 50 and the bores of the dial plate 40. The locking plates 70 are connected to the back plate 50 in a spaced relation so that the bracket assembly (which comprises the first and second brackets 55, 56) is located therebetween.

Figure 4:
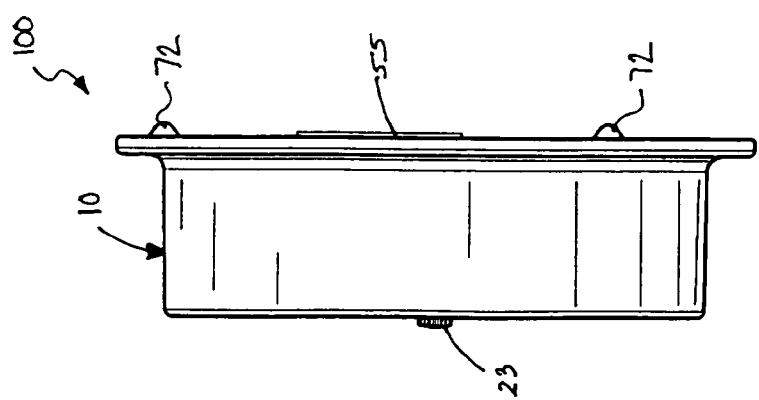
FIG. 4 is a right side view of the nautical instrument of FIG. 1.

Referring to FIG. 4, it can be seen that the protrusions 72 of the locking plates 70 extend furthest from the rear of the nautical instrument 100. As a result, when the bulkhead plate 80 is secured to the surface of a ship and the remaining assembly of the nautical instrument 100 is mounted to bulkhead plate 80 as described below, the protrusions 72 of the locking plates 70 press against the ship's surface. Because the back plate 50 is locked to the bulkhead plate 80 during this mounting, the force exerted on the protrusions 72 is transferred to the locking plates 70 and in turn to the O-ring 20 (via the dial plate 40). It is in this way that the dual locking plate system holds the nautical instrument 100 together while simultaneously exerting an additional compression force on the O-ring 20 to effectively seal the front face of the instrument 100.

The novel mounting of the nautical instrument 100 to a wall or other surface (i.e., a mounting surface) of a ship will now be described. Reference will be made to the structure identified in FIGS. 1-13E as necessary. First, the bulkhead plate 80 is used as its own drill jig/template. Once properly marked, the bulkhead plate 80 is secured to the mounting surface of the ship via a plurality of screws that pass through the mounting holes 85. The bulkhead plate 80 is mounted so that its front surface 81 faces away from the mounting surface.

Once the bulkhead plate 80 is mounted securely in place, the remaining nautical instrument assembly 100 (as shown in FIGS. 4 and 5) is oriented so that the rear surface 51 of the back plate 50 faces the front face 81 of the bulkhead plate 80. The nautical instrument assembly 100 is positioned adjacent to and above the bulkhead plate 80 so that the first and second brackets 55, 56 of the back plate 50 are vertically aligned with the first and second mounting plates 88, 89 of the bulkhead plate 80 respectively.

The nautical instrument assembly 100 (as used hereafter the term "nautical instrument assembly" refers to the nautical instrument of FIG. 2 less the bulkhead plate) is then lowered until the angled edges 90, 91 of the mounting plates 88, 89 slidably insert into the first and second channels 155, 156 of the brackets 55, 56, thereby resulting in a mating engagement of the back plate 50 to the bulkhead plate 80. During the lowering and slidable insertion, the centered protrusion 59 near the top 53 of the back plate extends into and is guided by the guide channel 83 of the bulkhead plate 50. Concurrently, the two lower protrusions 59 that are aligned near the bottom 54 of the back plate 50 contact and slide down the front surface 81 of the back plate 80. As the lowering of the nautical instrument assembly 100 continues, the two lower protrusions 59 of the back plate 50 slide over the horizontal ridge 86 of the bulkhead plate and snap lock into position below and against the underside of the horizontal edge 86.

The protrusions 59 of the back plate 50 perform four primary functions in the mounted state. First, the interaction of the protrusions 59 with the guide channel 87 and the horizontal ridge 86 of the bulkhead plate 80 prevents relative rotational movement between the back plate 50 and the bulkhead plate 80. Second, the interaction of the protrusions 59 with the horizontal ridge 86 snap lock the back plate 50 (and thus the nautical instrument assembly 100) to the bulkhead plate 80 in a manner that prevents accidental upward dislodgement and vibration. Third, the protrusion 59 are of a sufficient height that maintains the angled edges 90, 91 of the mounting plates 88, 89 (which are located in the channels 155, 156 of the brackets 55, 56 at this time) under pressing force against the overhang portions 165, 166 of the brackets 55, 56. This pressing force helps increase the integrity of the mounting of the nautical instrument assembly 100 to the bulkhead plate 80. Fourth, the protrusions 59 maintain a ventilation space between the back plate 50 and the bulkhead plate 80 to prevent moisture and heat build-up.

During the lowering of the nautical instrument assembly 100 onto the bulkhead plate 80 as described above, it is important to note that the bulkhead plate 80 fits between the locking plates 70. This allows the protrusions 72 on the locking plates 70 to come into contact with the mounting surface of the ship during the mounting procedure. The protrusions 72 are designed to have a height that results in the protrusions 72 being under pressure from the ship's mounting surface during the mating engagement of the bracket assembly and the mounting plate assembly. The protrusions 72 transfer this pressure force to the locking plates 70, which in turn transfer the pressure force to the compression plates 60 and eventually the O-ring 20 (via the dial plate 40) as a compression force. Both the O-ring 20 and the compression plates 60 compress so as to afford the necessary tolerance for mounting. However, because the compression plates 60 are constructed of a material that is harder than the O-ring 20, the O-ring 20 is compressed sufficiently to hermetically seal the perimeter of the lens 21 to the housing 10, thereby making the front face of the nautical instrument 100 watertight. The protrusions 72 also apply additional pressure to the back plate 50 so as to help maintain the angled edges 90, 91 of the mounting plates 88, 89 under pressing force against the overhang portions 165, 166 of the brackets 55, 56.

The existence of the protrusions 72 on the locking plates 70 and/or the existence of the protrusions 59 on the back plate 50 also serve the function of maintaining a space between the back plate 50 and the bulkhead plate 80 during the mating engagement. This space allows the back of the nautical instrument assembly 100 with proper ventilation and prevents the undesired build-up of moisture which can affect the functioning of the internal gauge mechanism(s). This space also serves to prevent internal heat build-up within the instrument itself when in prolonged direct sunlight.

The unique sliding and snap fit mounting system allows the nautical instrument assembly 100 to be lifted off its mounted location without having to remove screws. This allows the nautical instrument 100 to be easily removed for battery replacement, storage and/or instrument calibration. This mounting technique conceals all of the mounting screws used on the bulkhead plate 80 behind the housing 10 of the nautical instrument 100.

While the invention has been described and illustrated in sufficient detail that those skilled in this art can readily make and use it, various alternatives, modifications, and improvements should become readily apparent without departing from the spirit and scope of the invention.

What is claimed is:

1. A nautical instrument comprising:
    a housing having a front face comprising an opening, the housing comprising a coating comprising zirconium;
    a transparent lens hermetically enclosing the opening of the housing; and
    a gauge mechanism for measuring a desired standard, the gauge mechanism positioned within the housing.

2. The nautical instrument of claim 1, further comprising an O-ring compressed between the housing and the transparent lens.

3. The nautical instrument of claim 2, wherein the housing further comprises a material.

4. The nautical instrument of claim 3, wherein the material is plated with the coating comprising zirconium.

5. The nautical instrument of claim 4, wherein the material comprises brass.

6. The nautical instrument of claim 2, wherein the housing, the transparent lens and the gauge mechanism comprise a main body.

7. The nautical instrument of claim 6, wherein the main body comprises a rear surface.

8. The nautical instrument of claim 7, further comprising a bulkhead plate comprising a front surface and a means for securing the bulkhead plate to a surface of a ship.

9. The nautical instrument of claim 8, further comprising a bracket structure connected to either one of the rear surface of the main body or the front surface of the bulkhead plate.

10. The nautical instrument of claim 9, further comprising a mounting structure on the other of the rear surface of the main body or the front surface of the bulkhead plate, wherein the mounting structure and the bracket structure are sized and shaped to slidably mate with one another and secure the main body to the bulkhead plate.

11. The nautical instrument of claim 1, further comprising a dial plate comprising a ring-like wall portion defining a cavity having a floor, the ring-like wall portion having a top edge having a ledge sized and shaped to correspond to a perimeter of the transparent lens.

12. The nautical instrument of claim 11, wherein the dial plate is positioned within the housing.

13. The nautical instrument of claim 11, wherein the transparent lens rests on the ledge of the dial plate.

14. The nautical instrument of claim 11, further comprising a back plate enclosing a rear face of the housing.

15. A nautical instrument comprising:
    a main body comprising:
        a housing, the housing having a front face comprising an opening, wherein the housing comprises a coating comprising zirconium;
        a transparent lens hermetically enclosing the opening of the housing;
        a gauge mechanism for measuring a desired standard, the gauge mechanism positioned within the housing; and
        a rear surface.

16. The nautical instrument of claim 15, further comprising a bulkhead plate comprising a front surface and a means for securing the bulkhead plate to a surface of a ship.

17. The nautical instrument of claim 16, further comprising a bracket structure connected to either one of the rear surface of the main body or the front surface of the bulkhead plate.

18. The nautical instrument of claim 17, further comprising a mounting structure on the other of the rear surface of the main body or the front surface of the bulkhead plate, wherein the mounting structure and the bracket structure are sized and shaped to slidably mate with one another and secure the main body to the bulkhead plate.

19. The nautical instrument of claim 15, wherein the housing further comprises brass.

20. The nautical instrument of claim 19, wherein the brass is plated with the coating comprising zirconium.

\* \* \* \* \*